(No Model.) 6 Sheets—Sheet 1.
W. T. HARRIS.
CORN HARVESTER.
No. 532,781. Patented Jan. 22, 1895.
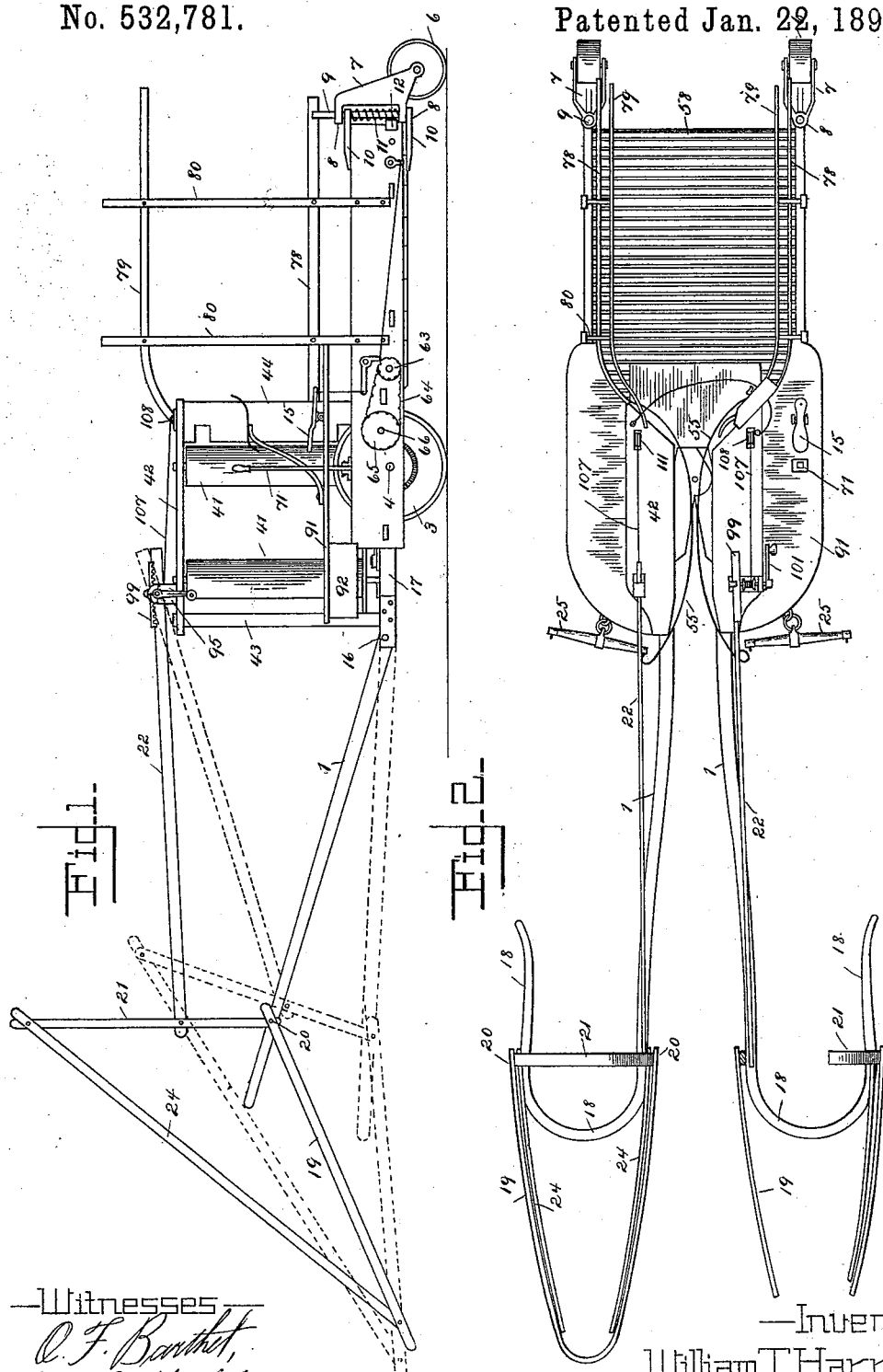
Witnesses
O. F. Barthel,
A. L. Hobby
Inventor
William T. Harris,
By Thos. S. Sprague & Son
Atty's.

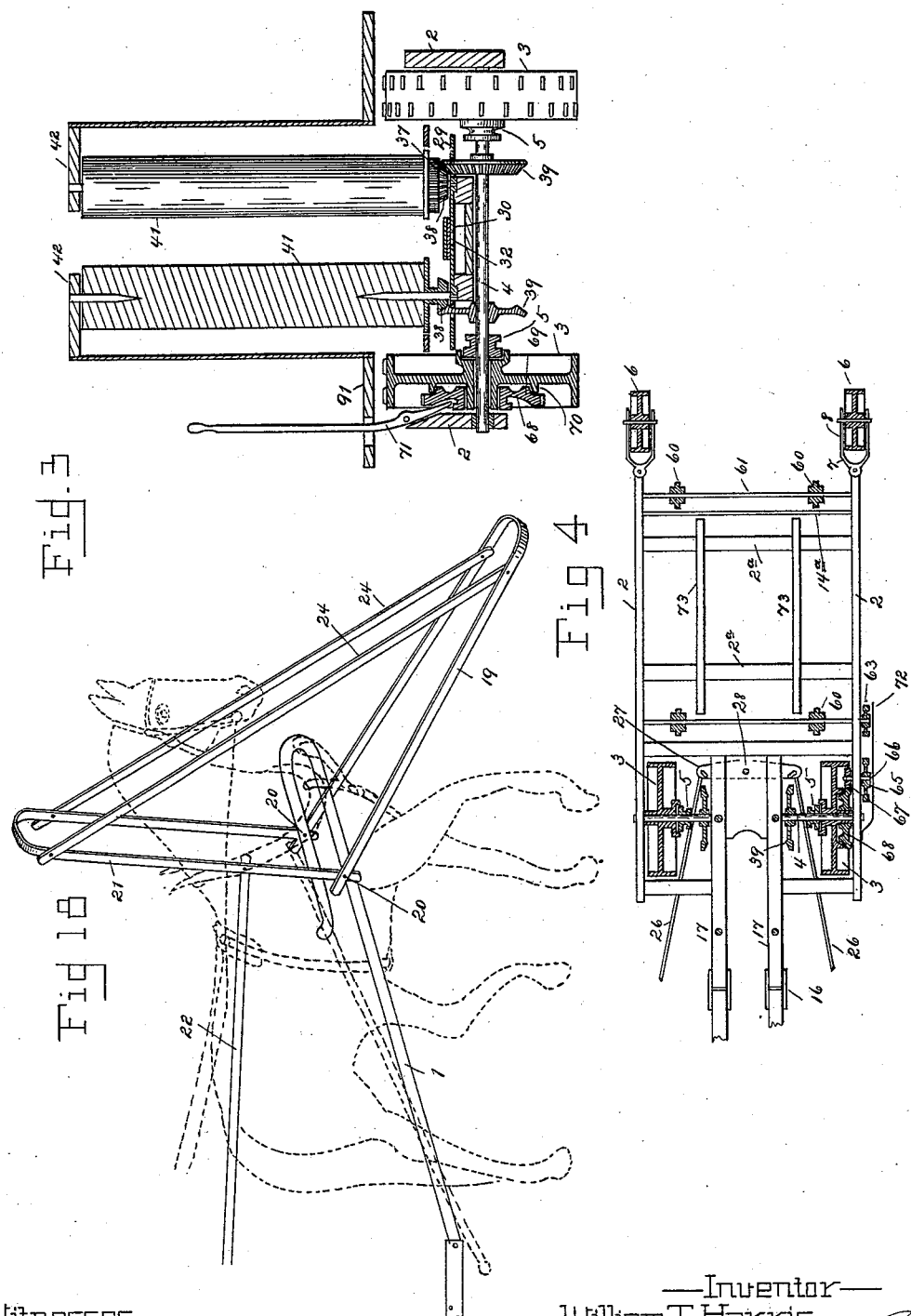

(No Model.) 6 Sheets—Sheet 3.
W. T. HARRIS.
CORN HARVESTER.
No. 532,781. Patented Jan. 22, 1895.
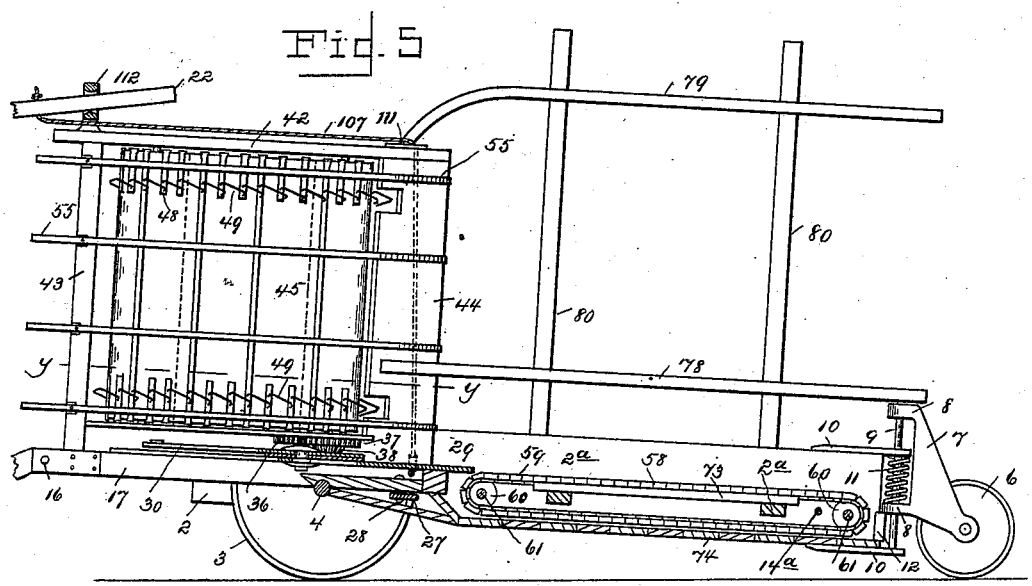
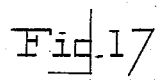
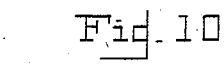
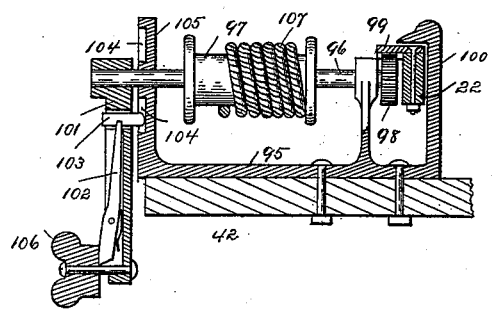
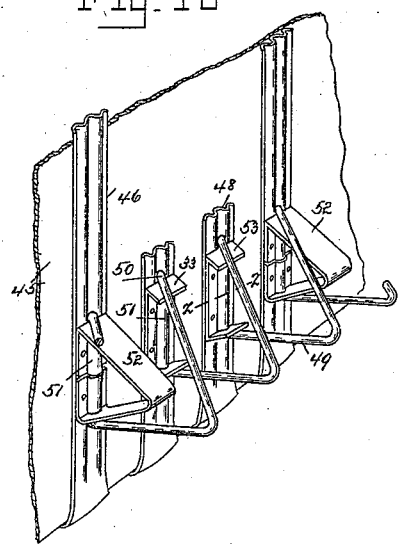
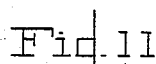
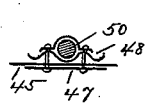
Witnesses
A. L. Nobby
M. M. Dogherty
Inventor
William T. Harris,
By Jno. T. Spragnet &c.
Atty's.

(No Model.) 6 Sheets—Sheet 4.

W. T. HARRIS.
CORN HARVESTER.

No. 532,781. Patented Jan. 22, 1895.

Witnesses
A. L. Hobby
M. B. Dougherty

Inventor
William T. Harris,
By [signature]
Atty's

THE NORRIS PETERS CO., PHOTO-LITHO., WASHINGTON, D. C.

(No Model.) 6 Sheets—Sheet 5.
W. T. HARRIS.
CORN HARVESTER.
No. 532,781. Patented Jan. 22, 1895.
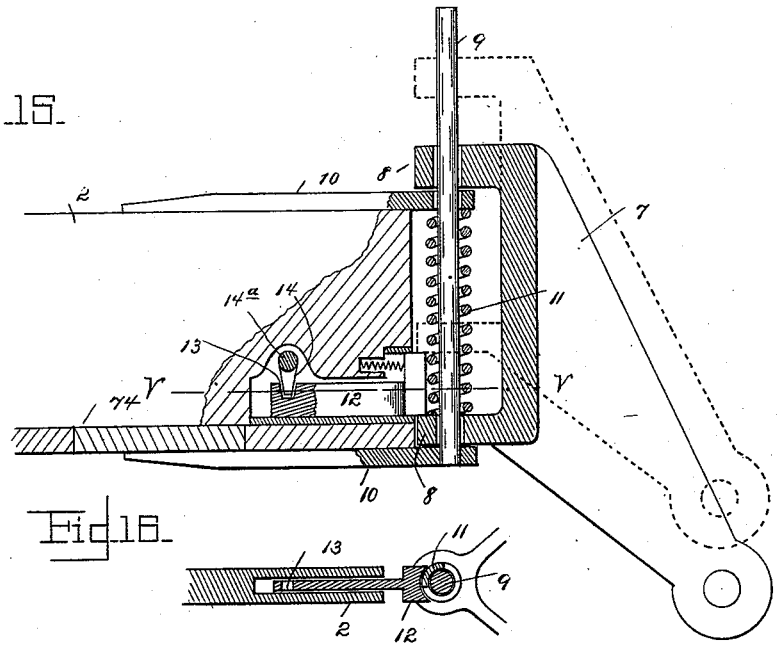
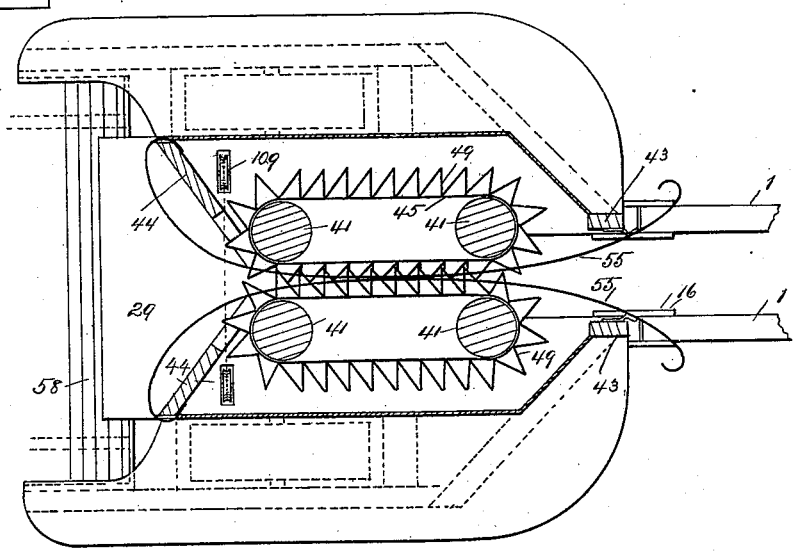
Witnesses
Inventor
William T. Harris
By [Attorneys]

(No Model.) 6 Sheets—Sheet 6.
W. T. HARRIS.
CORN HARVESTER.
No. 532,781. Patented Jan. 22, 1895.
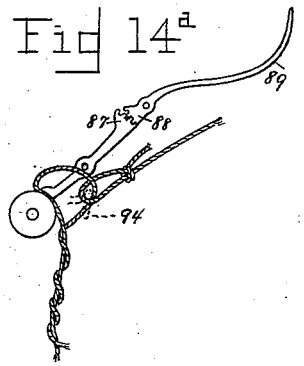
Fig. 14ª
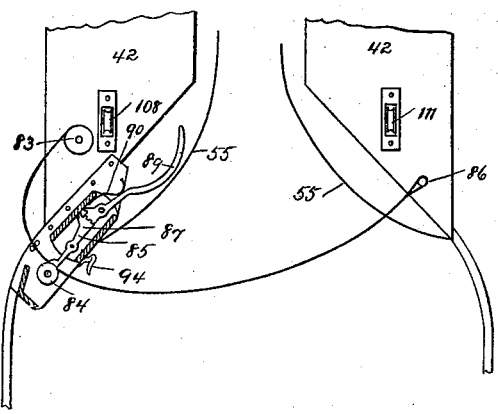
Fig. 12
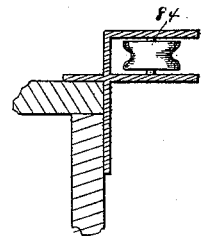
Fig. 14
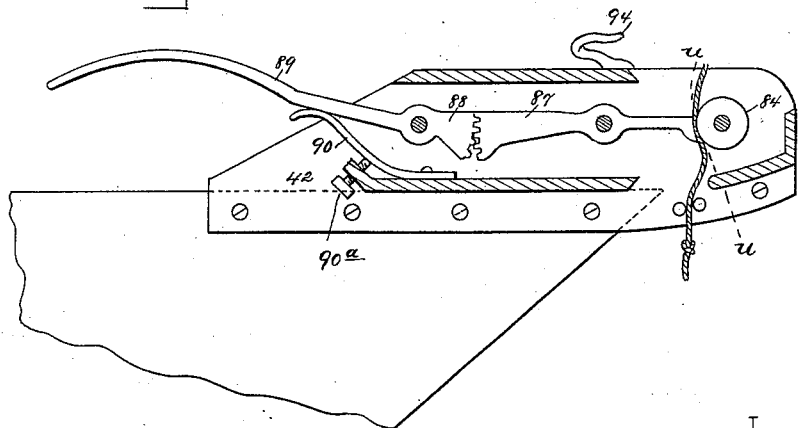
Fig. 13
Witnesses
A. L. Nobby
M. B. Dogherty
Inventor
William T. Harris,
By Mos Mayne & Co
Att'ys
THE NORRIS PETERS CO., PHOTO-LITHO., WASHINGTON, D. C.

UNITED STATES PATENT OFFICE.

WILLIAM T. HARRIS, OF DEFIANCE, OHIO, ASSIGNOR TO CHARLES E. SLOCUM, OF SAME PLACE.

CORN-HARVESTER.

SPECIFICATION forming part of Letters Patent No. 532,781, dated January 22, 1895.

Application filed January 5, 1894. Serial No. 495,831. (No model.)

*To all whom it may concern:*

Be it known that I, WILLIAM T. HARRIS, a citizen of the United States, residing at Defiance, in the county of Defiance and State of Ohio, have invented certain new and useful Improvements in Corn-Harvesters, of which the following is a specification, reference being had therein to the accompanying drawings.

My invention relates to that style of corn harvester in which the machine is drawn over the field by horses and which will automatically cut the standing corn as ordinarily planted either in check rows or drills and deliver it into a rack until sufficient has accumulated therein to form a shock, and from which rack the shock may be deposited on the ground in an upright position.

My invention consists principally in the general construction and arrangement of the various parts of the device as hereinafter set forth.

It also consists in certain novel details of construction relating to the cutting off device, the devices for gathering, holding, feeding and delivering the cornstalks in the operation of the machine, the device for tying the shocks and the device for dropping the shocks.

It also consists in a path clearing device, which gathers up the fallen corn stalks and clears the path for the horses.

Figure 7:
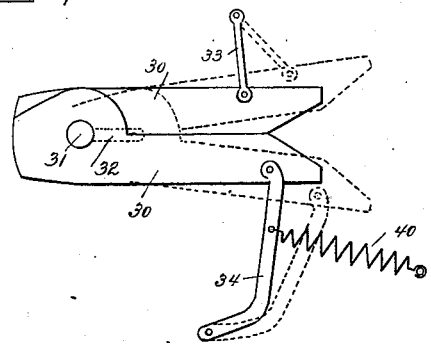
Figure 8:
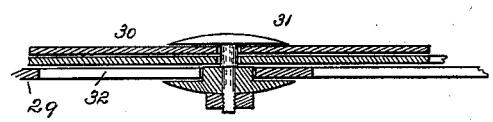
Figure 6:
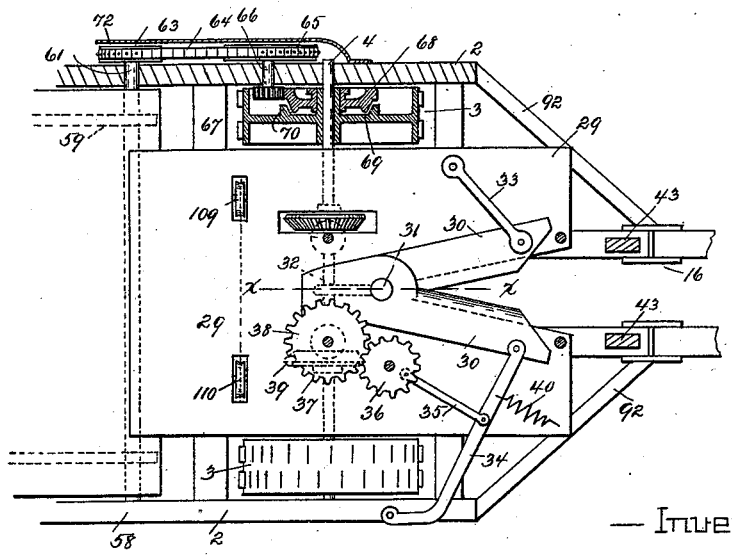

Figure 1 is a side elevation of the corn harvester complete with a part of the outside covering omitted. Fig. 2 is a top plan view of Fig. 1. Fig. 3 is a cross-section in a vertical plane through the axis of the front wheels. Fig. 4 is a horizontal section substantially in the plane of the axis of the front wheels. Fig. 5 is a vertical, central, longitudinal section. Fig. 6 is a plan view of the front part of the harvester frame with the superstructure removed to expose the cutting device. Fig. 7 is a diagram plan of the cutting apparatus showing the shears in closed position. Fig. 8 is vertical section on line $x\,x$ in Fig. 6. Fig. 9 is a horizontal section substantially on line $y\,y$ in Fig. 5. Fig. 10 is a detached perspective view of a section of one of the carrier aprons. Fig. 11 is a cross section on line $z\,z$ in Fig. 10. Fig. 12 is a diagram plan of the shock tying device. Fig. 13 is a detached plan view of the tension device shown in diagram in the previous figure. Fig. 14 is a cross section on line $u\,u$ in Fig. 13. Fig. 14$^\text{a}$ is a diagram showing the manner of tying the bundle. Fig. 15 is a sectional side elevation of the rear end of the frame showing its connection with the caster wheels. Fig. 16 is a horizontal section on line $v\,v$ of Fig. 15. Fig. 17 is a sectional elevation of the raising and lowering device for the fenders. Fig. 18 is a perspective view of one of the feeders.

The harvester represented in the drawings is intended to cut one row of corn at a time and is drawn by two horses hitched on the outside of two poles (1, 1) which project forward like the prongs of a fork and gather the row of corn into the fork, while the horses walk in the space between the adjoining rows.

The harvester has a rectangular main frame consisting substantially of two parallel side boards (2, 2) connected at suitable intervals by cross bars (2$^\text{a}$).

The harvester frame is supported horizontally above the ground on four wheels. The two front wheels (3, 3) are journaled inside the frame upon the harvester shaft (4) which is revolved by the wheels through the medium of suitable pawl and ratchet connections (5, 5) as in the usual manner. The two rear wheels (6, 6) are caster wheels carried on the rear ends of the side boards in the following manner: The arm 7 which carries the caster wheel has two lugs (8) which engage upon the pivot pin (9) which is secured in vertical bearings in two brackets (10, 10) secured to the side board. A coil spring (11) is sleeved upon the pivot pin between the upper bracket (10) and the lower one of the lugs (8). This lower lug (8) is held in position by a spring latch bolt (12) and which is slidingly secured in the rear end of the side board, and has a notch (13) which engages with the crank arm (14) on a transverse rock shaft 14$^\text{a}$ which is connected through suitable intervening mechanism with the foot lever (15) as shown in Fig. 1, all so arranged that the operator by pressing upon the foot lever (15) can withdraw the latch (12) and thereby free the lower lug (8) on the arm of each caster wheel, whereupon the weight of the rear end of the harvester is brought to bear against the springs (11) and thereby cause the rear end of said harvester to drop toward the ground, for the purpose more fully hereinafter described.

The draft poles are hinged (at 16) to the front end of the rear extensions or hounds (17) so as to be capable of a vertical play. The poles from their point of attachment with the hounds crook outwardly toward the front ends and terminate in a return bend (18) between which and the pole the horses are hitched. The front end of each pole carries a path clearing device, which consists of a fender (19) pivotally secured (at 20) to the pole and return bend respectively.

21 is a yoke having its lower end pivotally secured to the pole and return bend respectively at 20. This yoke extends upwardly over the horses' heads and is held in a substantially vertical position by means of a connecting bar 22 which is pivotally connected to the yoke and extends rearwardly and is adjustably secured to the harvester frame. The end of the fender 19 is connected to the upper portion of the yoke 21 by means of the connecting bars 24.

The parts as described and shown are intended to operate as follows: When the horses are hitched to the poles and the connecting bars (22) are so adjusted and connected to the harvester frame that the front end of the fender is held sufficiently above the ground, it will be seen that in case a horse steps into a low place or stumbles, which would lower the front end of the pole, the front end of the fender would still be held substantially at the same height above the ground, by the action of the connecting bar (22) as shown in dotted lines Fig. 1. The fender being thus held in front of the horses will pass on opposite sides of the row of corn and all the corn stalks which might have fallen into the space between the adjoining rows are thus lifted up from the ground and a clear path is formed for the horses to walk in, thus preserving much corn from destruction. The horses are hitched to the whiffle-trees (25) which are supported in suitable proximity to the horses by means of draft rods (26) which connect the whiffletrees with an evener (27) pivotally secured (at 28) in the center of the harvester frame. The fork or opening between the two poles extends back between the hounds a distance into the frame of the harvester and leads into the V-shaped recess formed in the rear end of a bed plate (29) which is rigidly supported upon the front of the harvester. Upon this bed plate the cutting device is supported.

The cutting device consists of two shear blades (30) secured by a pivot bolt (31), which passes through a slot (32) in the bed plate and is free to slide therein. The front ends of the shear blades are connected to links (33, 34) and one of the links (34) is connected to a pitman (35) which is actuated by suitable mechanical connection with the front axle, such as is shown in the drawings, wherein 36 is a gear pinion which carries one end of the pitman and meshes with the gear wheel (37), and upon the same shaft with this gear wheel is a bevel pinion (38), which meshes with a bevel pinion (39) on the shaft of the front wheels. The parts being thus arranged as shown and described it will be seen that when the harvester is drawn over the ground, a vibrating motion will be imparted to the links (34) and this motion will draw the shear blades back and forth, with the pivot (31) of the blades traveling in the slot (32) and on account of the action of the links (33, 34) during such travel, the shear blades will alternately close and open, being wide open at the forward position of the shears, as shown in Fig. 6, and completely closed at the most rearward position of the shears, as shown in Fig. 7.

The shear blades are provided with suitable cutting edges and the front ends are beveled as shown, and if desired one or both of the toggle levers may be provided with retracting springs (40). Above the shears is located a device for feeding the corn to the shears, which consists of four vertical rollers (41) arranged in pairs on opposite sides of the center of the fork. The ends of the rollers are provided with gudgeons, the lower ones of which are stepped in the bed-plate, and the upper ones of which are held in bearings in the top plate (42), which will form a part of the frame and are supported by the uprights (43, 44) from the main frame. The two rear rollers of each pair of rollers are revolved by intermediate gear connection with the shaft through bevel gears (38, 39). Each pair of rollers carries an endless canvas apron (45) which is constructed, as shown in Fig. 10, wherein 46 are corrugated metal strips riveted at intervals to the canvas with their ends bent over the edges of the canvas, plain strips (47) being used on the inner side of the canvas to hold the heads of the rivets. Intermediate metal strips (48) are placed between the strips (46) to reinforce the edges of the canvas. These strips serve as points of attachment for a series of spring teeth (49) which are preferably formed of a continuous piece of wire with vertical bends (50) which fit into the central corrugation of the metal strips and are held therein by caps (51), riveted to the strips. These caps are formed of metal strips bent into triangular shape, as to form outwardly projecting rigid teeth (52). The caps on the intermediate short strips (48) are however, preferably provided only with short ears (53) supporting the spring teeth at the base.

The spring teeth on the canvas aprons project to a sufficient distance to overlap each other in the space between the apron, but to prevent the teeth from interfering with each other they are not directly opposite each other on the two aprons. If desired more than two rows of spring teeth may be provided for each apron.

In the space intervening between the aprons are placed the spring metal guide bars (55). They are secured horizontally in pairs on opposite sides and their ends which curve outwardly in front and rear of the aprons are secured to the uprights (44, 43) of the frame and are entirely free between the ends.

Between the side-boards of the rear end of the main frame is secured an endless traveling platform (58). This is carried by two endless link chains (59), to which boards forming the platform are secured. The chains pass over sprocket wheels (60) which are carried on the transverse shafts (61) journaled in the frame. The front shaft (61) has on one end a sprocket wheel (63) which is driven by the chain (64) from a sprocket wheel (65). The sprocket wheel (65) is fastened upon the stub shaft (66) which is journaled in the sideboard and carries at its inner end a gear wheel (67), which meshes with the gear wheel (68) journaled upon the front shaft. (See Fig. 6.) The gear wheel (68) is loose upon the shaft and has a conical flange (69) which is adapted to engage frictionally with the corresponding flange (70) in one of the front wheels. A lever (71) projects upwardly through the platform in proximity to the driver's seat on the harvester and is adapted to carry the wheel (68) in and out of frictional engagement with the ground wheel and thereby transmit motion from said ground wheel to the traveling platform. A suitable box or casing (72) incloses the gear wheels on the outside of the side-board. The top of the platform is supported upon longitudinal guide bars (73) and its lower portion is supported upon the bottom (74) of the frame. This bottom (74) extends forwardly and upwardly to near the axle of the front wheels. Upon both sides of the platform are arranged horizontal rack bars (78, 79) which are secured to suitable standards (80) from the frame. These guide rails slightly overhang the sides of the platform and their forward ends curve inwardly and are secured to the rear end of the roller supporting frame, the whole forming a rack for holding the cut corn stalk upon the platform.

The device for tying the shock I construct as follows: The cord for tying the shock may be supplied from a spool (83) which is carried on the rear end of one of the top boards (42) or it may be a piece of cord cut to the proper length dispensing with the spool. The cord passes through between a grooved guide roller (84) and the foot of a tension lever (85), and then crosses the throat in rear of the aprons with the end of the cord fastened to a hook (86) upon the rear end of the other top board. One end of the tension lever (85) is adapted to press the cord into the groove of the guide roller (84) and the opposite end is provided with a toothed segment (87) which engages with the toothed segment (88) formed at one end of the tension regulating lever (89), the long arm of which projects into the throat at the rear end of the top boards (42) and a spring (90) presses against the tension lever to apply suitable tension to bind the cord between the guide roller (84) and the foot of the tension lever (85). The tension of the spring 90 may be regulated by a set screw 90$^a$.

The place for the driver is provided upon a platform (91) above one of the ground wheels on the outside of one of the canvases. The front wall of this platform is supported by the fender board (92) which connects the forward ends of the hounds with the forward ends of the side boards. Upon this platform the foot lever (15) and hand lever (71) are arranged in convenient proximity for the driver, and a suitable covering is provided on the outside of the canvas to protect the driver from contact with the teeth of the apron.

The parts being thus constructed and arranged as shown and described they are intended to operate as follows: The horses drawing the machine along the ground walk along the sides of the row of corn in the space between the adjoining rows. In this way the row of corn is guided between the poles to the machine the path clearing device, acting in the manner described to divide the corn which might overhang in the path of the horses and direct it out of the way to clear the path for the horses, and prevent it from being trampled upon. As the space between the poles toward the rear end becomes more and more contracted, the stalks are brought into an upright position and guided into the cutting edges of the shears. These shears by proper proportioning of the actuating gears are made to have a rearward movement during their closing equal to the forward movement of the harvester and thus during the action of cutting off the stalks, the shears and stalks are nearly stationary in relation to each other. By this arrangement the stalks are cut in the position in which they stand and there is no tendency to pull out the roots.

I do not confine myself to operating the shears by a positive connection with the front axle as it will be seen that if the drive connection of the toggle (34) is omitted the stalks in being gathered between the shears will by their impact force the shears to the rear and thereby close the cutting edges upon the stalks, and when the stalks are thus severed, the spring (40) would immediately draw the shears to the front ready for the next operation. It will be seen that the traveling aprons extend in front of the shears and thus before the stalks are cut off they are taken hold of by the spring teeth of the canvas apron, which thus hold them against any displacement which may be caused by the crowding of the stalks together, or to the resistance of the cutting action of the shears.

In practice I prefer to give to the feed apron a movement a little faster than the movement of the harvester and thus I make sure that the stalks are properly held while they are being cut off, the springs (55) acting to guide the stalks between the cutting edges of the shears, and as the springs approach each other, they compact the stalks of corn in the center line of the shears and thereby facilitate the cutting off. As they are yielding they will occasion no choking or bundling of the stalks but allow the corn stalks to be freely carried through and over the shears by the spring teeth of the canvas.

By making the spring teeth in the manner described of a continuous wire, the teeth are perfectly free, and at the same time they are not liable to become entangled with the corn.

The teeth (52) by their rigidity provide for contingencies in very thick corn, by preventing too much pressure from being brought upon the spring teeth (49). The severed ends of the stalks after being cut pass over the rear end of the shears and are still carried by the aprons and firmly guided by the springs (55) and carried to the rear into the rack. Here the teeth of the aprons withdraw from the corn stalks and the stalks remain stationary upon the base plate (29) but the force of the incoming stalks constantly push them to the rear. The stalks are now free to accumulate in the throat at the front end of the rack and are gathered between the outwardly curved ends of the springs and held in an upright position by means of the cord from the spool 83. As the shock now begins to accumulate it is gradually pushed rearward upon the traveling platform and at the same time the corn stalks held up in position by the tension of the cord. This cord is paid out automatically by the pressure of the growing shock which presses against the long arm of the tension regulating lever (89) and thereby releases the cord until such pressure is relieved. When a sufficient amount of corn stalks have accumulated in the rack to form a shock, the operator removes the looped end of the cord from the hook (86), engages it into a hook (94) on the opposite side, at the same time drawing it around the shock. This brings the end of the cord near the point where the cord is clamped between the guide roller (84) and the tension lever (85). Now by taking hold of the cord in front of the roller (84) and drawing the cord tight, the shock is compressed and ready to tie. A separate cord may now be used for tying the shock or if it is desired to use the cord from the reel (83) it should be cut off about six inches from where it is clamped (a suitable knife may be fixed conveniently to the harvester) and withdrawing it from the clamp and by passing the free end of the cord through the looped end and tying the end which has been released from the hook 94 in any suitable manner the tying is completed; or if a separate cord is used after the shock is tied the cord from the spool is released from the hook 94 and clamp 84, 85 and rewound on the spool 83. The operator now seizes the lever (71) and throws the platform into gear and at the same time puts his foot upon the foot lever (15). By the latter action he unlocks the caster wheels, so that the rear end is free to drop under the weight of the accumulated shock and compressing the spring (11) drops almost to the ground, and is locked in this position by the latches engaging now underneath the lugs 8 as shown in Fig. 5. At the same time the movement of the platform discharges the shock at the rear end. Owing to the converging base of the shock when the platform is tilted the shock will remain in an upright position and when it reaches the end of the platform it will slide from the platform onto the ground and there remain in an upright position, owing mainly to the proximity of the platform to the ground. The shock is thus left standing upright on the ground in rear of the harvester and as soon as the platform is relieved of the shock the operator retracts the latches 12 by means of the foot lever when the pressure of the springs (11) will immediately return the rear end of the platform to its normal position.

I preferably provide my machine with a raising and lowering device for the fenders which is of the following construction: In a suitable frame (95) secured near the forward end of the board (42) on the driver's side of the machine, is journaled the shaft (96) carrying the winding drum (97) and pinion (98).

(99) is a rack-bar secured to the rear end of the connecting bar (22) adapted to mesh with the pinion (98), being held in engagement therewith by the guide arm (100).

(101) is a crank arm on the outer end of the shaft (96) provided with the spring latch lever (102) carrying the bolt (103) adapted to engage with the notches (104) in the standard (105) of the frame, and so arranged that by pressing on the knob (106) the bolt may be withdrawn.

(107) is a cord secured to the rear end of the connecting bar (22) on the other side of the machine, and this cord is led around over sheaves 111, 110, 109, 108 (which are so arranged as to guide the cord out of the way of the passing corn) onto the drum 97. Thus by turning the crank (101) both fenders may simultaneously be raised or lowered.

What I claim as my invention is—

1. In a harvester, the combination with a frame, of a draft pole, a vertically swinging fender on the outer end of the pole, an angular extension on the fender, and an adjustable independent connection between the extension and frame, substantially as described.

2. In a corn harvester, the combination with the harvester frame, of two draft poles secured to the frame on opposite sides of its longitudinal center and forming guides to guide the standing corn to the harvester, return bends formed on the front end of the draft poles and fenders carried by and pivotally secured on the poles and return bends and in advance of the return bends, substantially as described.

3. In a corn harvester, the combination with the frame, of a bed plate mounted upon the front end of the frame and provided with a recess, two cutting blades adapted to operate in said recess, a pivot bolt pivotally connecting the rear ends of the cutting blades, and engaging in a longitudinal slot in the bed plate and links carrying the front end of the shear blades and a spring for holding the shear blades normally open, substantially as described.

4. In a corn harvester, the combination with the frame or platform, of the bed plate (29) the shear blades operating in a recess of said bed plate, the pivot bolt (31) connecting the rear ends of the shear blades, the slot (32) in the bed plate into which said pivot bolt engages, the links (33, 34) carrying the front end of the shear plates, the pitman (35) and its direct connection, substantially as described.

5. In a corn harvester, the combination with the frame or platform, the shears operating in a recess in the front end of said platform, and having a longitudinally sliding movement thereon, links carrying the free ends of the shear blades, endless carriers mounted upon the platform above said shears and having projecting teeth, and spring bars horizontally supported above the shears between the carriers and having outwardly curved ends, substantially as described.

6. In a corn harvester, the combination with the frame of the recessed bed plate 29, the shears 30 having a longitudinally, reciprocating motion thereon, the pivot bolt (31) of the shears, the slot (32) in which said pivot bolt slidingly engages, the links (33, 34) carrying the free ends of the shear blades, the endless carriers mounted upon the platform above the shears, the pitman (35) and the intermediate gears (36, 37, 38) for imparting motion to the pitman, substantially as described.

7. In a corn harvester, the combination with the frame or platform, and the cutting apparatus centrally supported upon the front end thereof, of an endless platform in rear of said cutting apparatus, a rack forming a receptacle for the cut stalks in rear of said cutting apparatus, traction wheels supporting the front end of the frame, caster wheels supporting the rear end of the frame, and having pivotal and a vertical sliding connection with the frame and means for controlling the vertical movement of the caster wheels, substantially as described.

8. In a corn harvester, the combination with the frame or platform and the cutting apparatus supported upon the front end thereof, of an endless platform in rear of said cutting apparatus, a rack forming a receptacle for the cut stalks in rear of the cutting apparatus, traction wheels supporting the front end of the frame, caster wheels having a vertically sliding connection with the rear end of the frame, coil springs normally supporting the frame upon the caster wheels and a locking device for the sliding connection, substantially as described.

9. In a corn harvester, the combination with the frame or platform supported upon traction wheels in front and caster wheels in rear, of the pivot pins (9) slidingly connecting each caster wheel to the rear end of the frame, the guide bearings (8, 10) through which the pivot pin passes, the coil springs (11) interposed between the guide bearings and the locking latch (12) under control of the driver, substantially as described.

10. In a harvester, the combination with a platform, of a cord securing device on one side of the platform, a tension device at the opposite side consisting of a fixed and an adjustable member, and an extension arranged in the path of the corn for moving the adjustable member, substantially as described.

11. In a corn harvester, the combination with the frame and cutting apparatus, of the endless canvas carriers (45) mounted above said cutting apparatus, the metallic strips (46) secured thereto at intervals, the spring teeth (49) formed of continuous wire and the caps (51) securing said teeth and forming the rigid teeth (52), substantially as described.

12. In a corn harvester the combination with the harvester frame, of the draft pole provided with a return bend, the fender pivotally secured at its rear end to the draft pole, the yoke carrying the front end of the fender, the bar (22) connecting the yoke with the harvester frame, and means under the control of the driver for lengthening or shortening said bar, substantially as described.

13. In a corn harvester the combination with the harvester frame, of the draft pole provided with a return bend the fender pivotally secured at its rear end to the draft pole, a yoke carrying the front end of the fender the bar (22) connecting the yoke with the harvester frame and a rack and pinion device under the control of the driver for lengthening or shortening said bar, substantially as described.

In testimony whereof I affix my signature in presence of two witnesses.

WILLIAM T. HARRIS.

Witnesses:
GEO. ROCK,
H. G. BAKER.